United States Patent [19]

Czaplicki

[11] Patent Number: 5,028,474
[45] Date of Patent: Jul. 2, 1991

[54] CELLULAR CORE STRUCTURE PROVIDING GRIDLIKE BEARING SURFACES ON OPPOSING PARALLEL PLANES OF THE FORMED CORE

[76] Inventor: Ronald M. Czaplicki, 4948 W. Park Dr., Fairview Park, Ohio 44126

[21] Appl. No.: 385,259

[22] Filed: Jul. 25, 1989

[51] Int. Cl.$^5$ .................. B32B 3/12; B32B 3/28
[52] U.S. Cl. ..................... 428/178; 428/116; 428/183; 428/180; 428/179; 428/184; 428/185; 428/186; 428/119; 428/604; 428/457; 428/537.7; 428/500; 428/224; 428/72; 428/73; 428/213; 52/807; 52/792; 52/798; 52/799
[58] Field of Search ............... 428/116, 183, 180, 178, 428/179, 184, 185, 186, 119, 604, 457, 537.7, 500, 224, 72, 73, 213; 52/807, 792, 798, 799

[56] References Cited

U.S. PATENT DOCUMENTS 1,875,188 8/1932 Williams .................. 428/185 X
2,160,677 5/1939 Romanoff .................. 428/183
2,561,147 7/1951 Smith .................. 428/116 X
2,912,345 11/1959 Weiss .................. 428/179
4,397,902 8/1983 Resch .................. 428/180 X Primary Examiner—Ellis P. Robinson
Assistant Examiner—William P. Watkins, III
Attorney, Agent, or Firm—Baldwin, Egan, Fetzer, Oldham & Oldham

[57] ABSTRACT

A three-dimensional structure adapted for use for instance as a core in sandwich panel-type construction, and comprised of substantially continuous unbroken sheet material to which has been imparted an alternating sequence of ridges and valleys, creating spaced rows of adjacent inclined rectangular-shaped facets connected by intermediate rows of adjoining parallelogram-shaped facets. The core structure provides substantially gridlike bearing surfaces on two opposing parallel bearing planes thereof to which face sheets may be affixed, to form a sandwich panel.

14 Claims, 3 Drawing Sheets

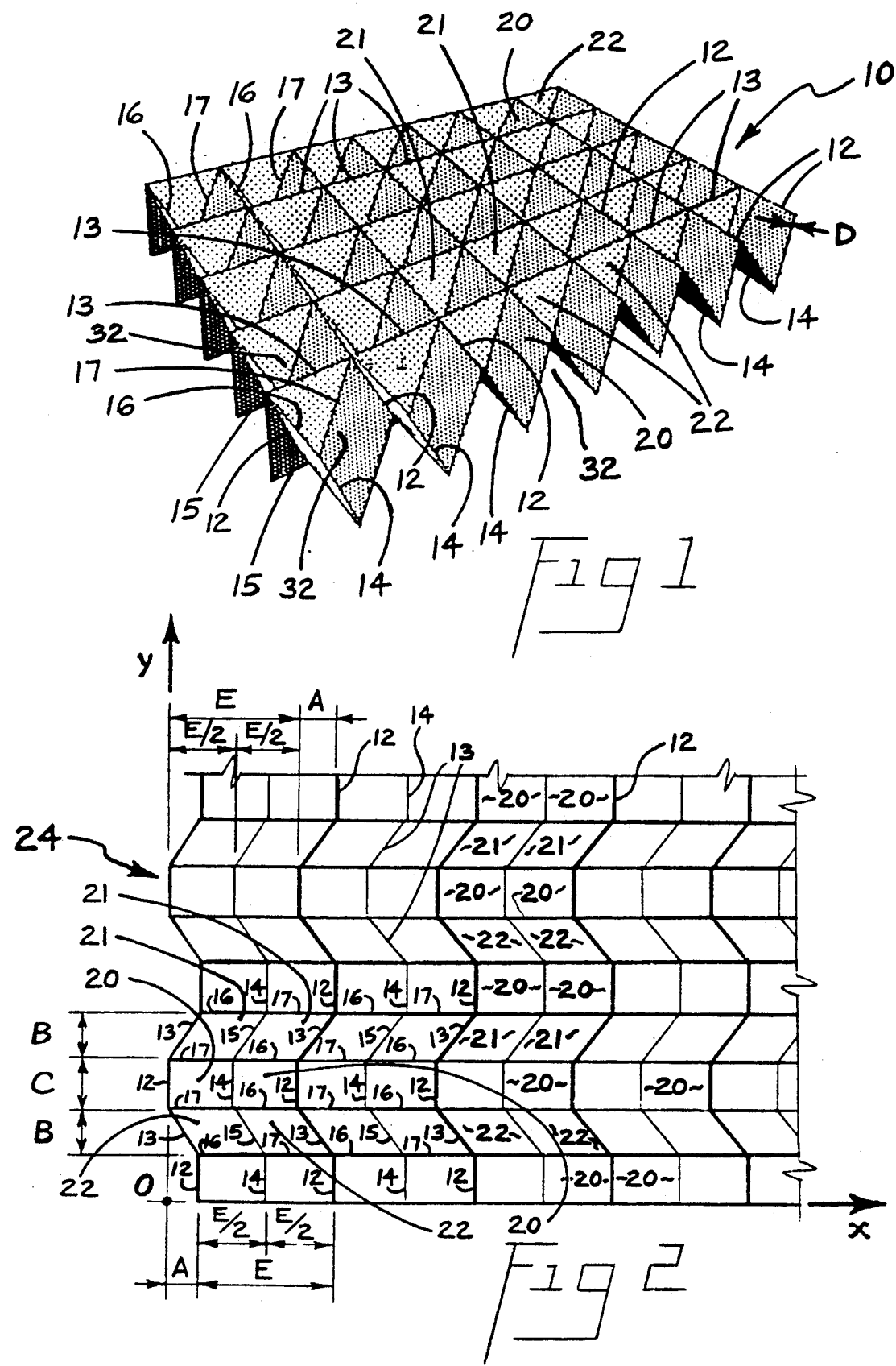

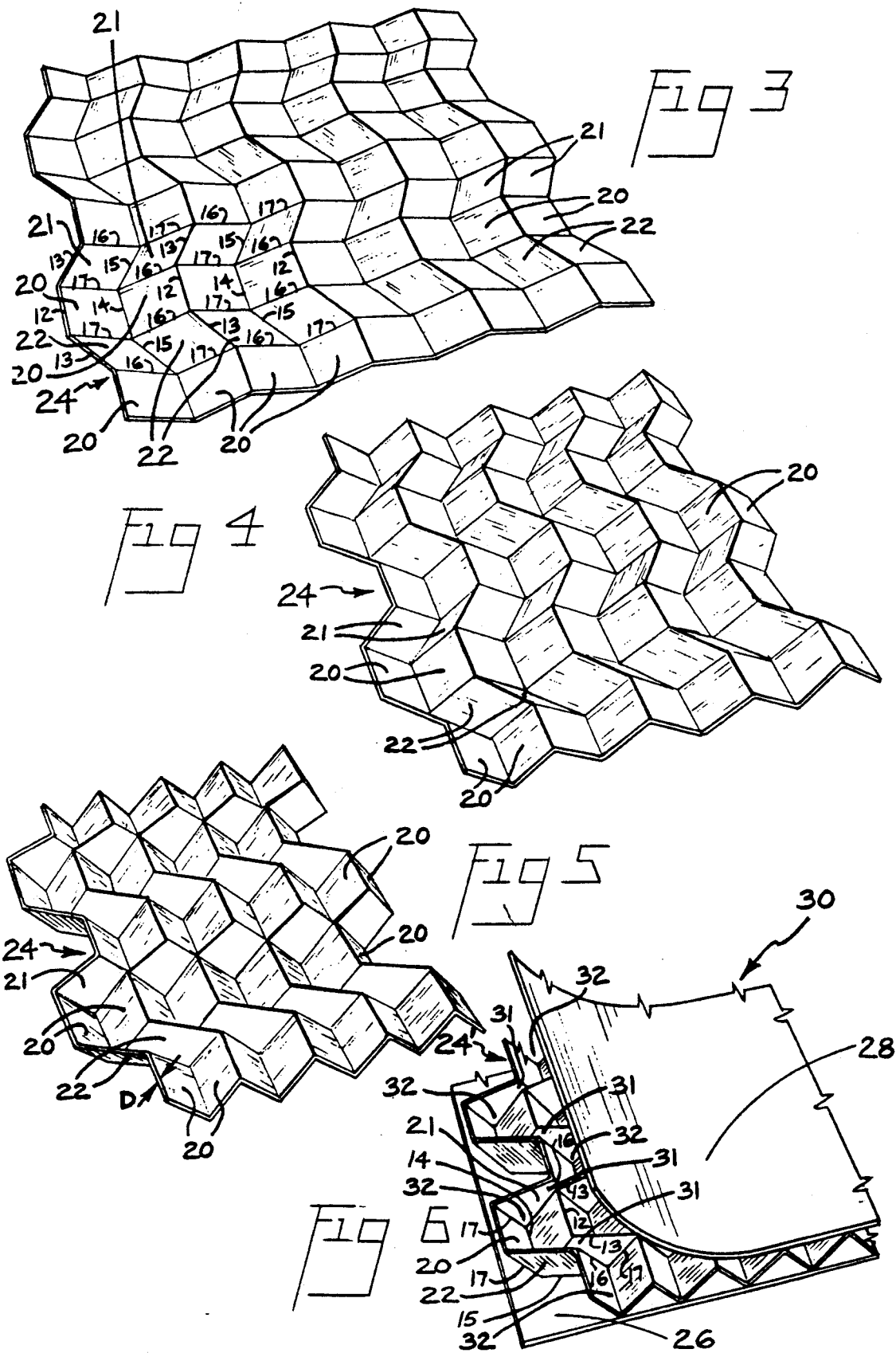

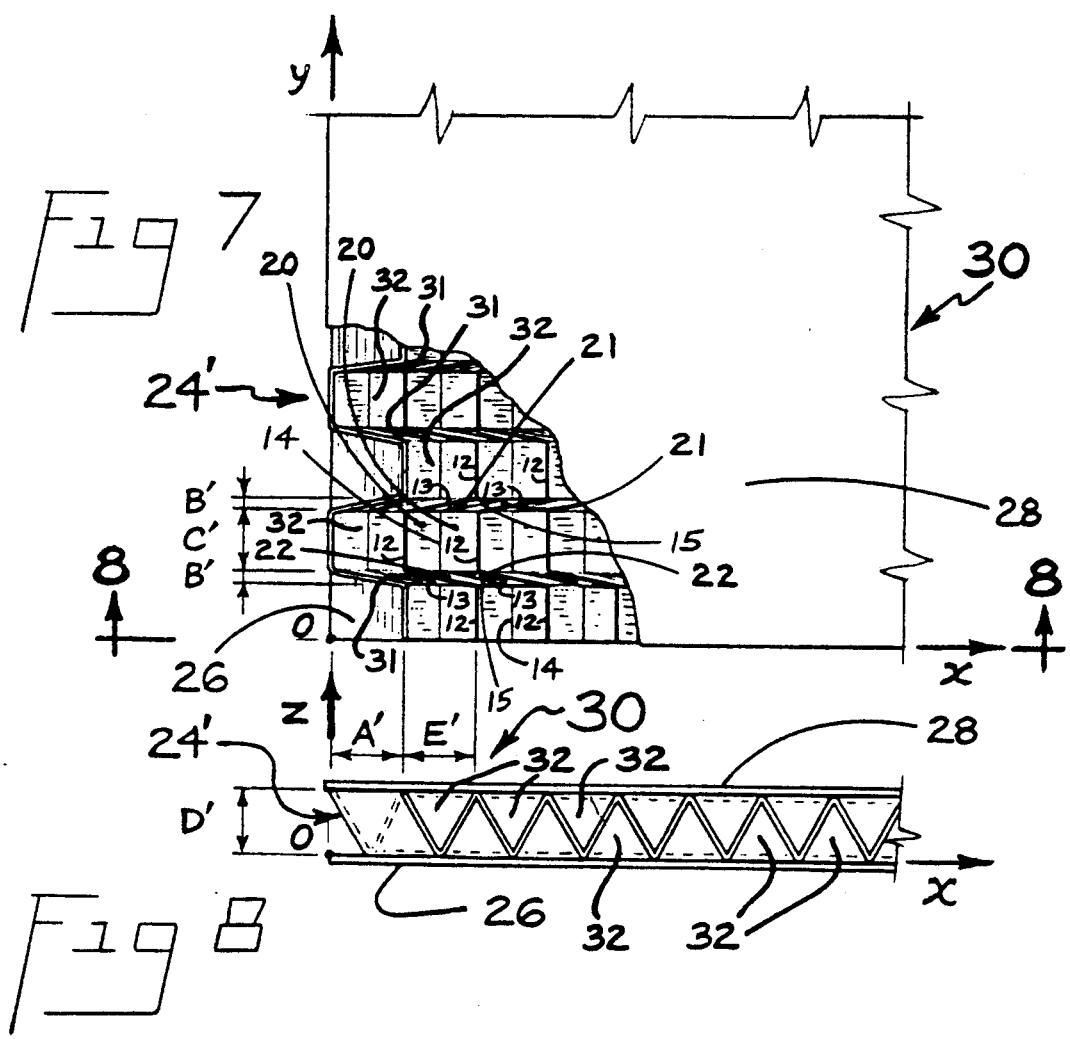

CELLULAR CORE STRUCTURE PROVIDING GRIDLIKE BEARING SURFACES ON OPPOSING PARALLEL PLANES OF THE FORMED CORE

The present invention relates in general to structural cores for generally lightweight sandwich panels. More particularly, this invention relates to unitary cellular core structures comprised of formed sheet material such as metal, plastic, paper, fabric, or composite materials, and so configured as to provide substantially continuous lines or ridges of support to which face sheets may be affixed to form, for instance, sandwich panel-type structures.

BACKGROUND OF THE INVENTION

The technical aspects and advantages of sandwich panel construction are well known for use in applications where both structural integrity and light weight are important or required. Sandwich panels with thin-walled cellular cores are frequently called "honeycomb core panels" due to the appearance of the hexagonally-shaped compartments characterized by the assemblage of interconnecting ribbons or strips of material which make up the core structure. The cellular nature of the core can also be achieved by arranging the thin-walled material into compartments of other shapes. These include, but are not limited to, triangular, square, rectangular, octagonal, prismatic, pyramidal, cylindrical and conical shapes, or combinations thereof.

Various materials are used to fabricate such cellular cores, and the coactive face sheets of sandwich panel structures. depending on the structural and functional design requirements of the panel assembly, the materials may include various metals, plastics, fabrics, including paper, or other composite or non-composite materials. Also, depending on the materials selected, adhesives, resins, welding, brazing, diffusion-bonding, or other means of fixing the face sheets to the core may be utilized.

The function of the core in a cellular sandwich panel structure is analogous in a general way to the function of the vertical web of a structural I-beam. Similar to the I-beam web, the primary purpose of the core is to resist and distribute the shear forces throughout the coactive components of the loaded structure, while contributing resistance to crushing, buckling, or warping at any portion on or within the structure. An ideal cellular core structure would allow a sandwich panel assembly to emulate the behavior of a similarly-proportioned, homogeneous solid plate of material under load, at a fraction of the weight. Many cellular core structures occupy less than ten percent of the volume between the enclosing face sheets.

Honeycomb core panels and assemblies are used extensively in the aerospace industry for airframe parts and components such as wing sections, floor panels, seats, and overhead luggage compartments. They are also used in the marine craft industry for assorted wall, ceiling, floor, and cabinet components, in addition to berths, tables, desks, and other furnishings. Honeycomb core panels are being used with increasing frequency in the construction industry for acoustical panels, doors, shelves, and partitions. Unfortunately, the inherent complexity, limited availability, and relatively high cost of manufacturing structural honeycomb core materials impose significant limitation on more widespread use of sandwich panel technology in other panel product applications. Alternate and more practical core configurations for various sandwich panel applications are often sought.

The premise of simplifying the configuration of cellular sandwich panel cores has been the object of numerous patents. Core structures of the prior art have generally been configured on the basis of one or more of the following five primary strategies or concepts:

1. Molding, embossing, vacuum-forming, or otherwise mechanically depressing sheet material into the desired cellular configuration by subjecting the material to relatively large plastic deformations or elongations, effecting substantial reductions in gauge over large portions of the material. This strategy for creating panel cores is exemplified by the following U.S. Pat. Nos.:

3,485,596 dated Dec. 23, 1969 in the name of Jean Alleaume, and entitled Devices Constituting Corrugated Sheet Elements or Plates and Their Various Applications; Shallow, V-shaped ribs or embossments pressed into the sheet material in a pattern constituting an array of adjoining hexagons, with the individual projecting ribs intersecting at specially shaped deformations;

3,525,663 dated Aug. 25, 1970 in the name of Jesse R. Hale, and entitled Anticlastic Cellular Core Structures Having Biaxial Rectilinear Truss Patterns; An array of drawn, circular-capped nodes projecting in opposing directions from the centerline of the sheet, requiring large plastic elongations and substantial reductions in gauge as the elongated portions of material are deep-drawn from the original sheet;

3,785,914 dated Jan. 15, 1974 in the name of Harry A. King, and entitled Structural Material and Means and Method of Making It; Substantially flat-crested, serpentine corrugations pressed into the core sheet material by stretching or molding the core material while in a molten or plastic state;

4,035,536 dated July 12, 1977 in the name of Hadley F. Morrison, and entitled Sandwich Panel Core; A repeating series of alternating hexagonal and triangular embossments stamped, rolled or pressure vacuum-formed into the sheet material, creating a multiplicity of indented compartments;

4,612,225 dated Sept. 16, 1986 in the name of Don E. Graffam et al., and entitled Structural Panel; An array of adjacent, long, open-ended, triangular cells oriented transversely with respect to the centerline of the original sheet material, requiring extensive plastic elongation in the forming process, best suited mainly for thermoplastic materials.

2. Combination of lancing, piercing, or otherwise partially cutting and folding the sheet material into the desired cellular configuration, resulting in openings or penetrations through the core sheet material. This strategy for creating panel cores is exemplified by the following U.S. Pat. Nos.:

3,452,494 dated July 1, 1969 in the name of Hector Thomas Prior, and entitled Multicurved Building Structure; Punched square apertures or openings, with the interconnecting strip portions V-bent into a series of inclined webs;

3,591,351 dated July 6, 1971 in the name of Frederick E. Ullman, and entitled Reticulated Structure and Method of Manufacture; Numerous lancings or piercings of the sheet material, the slitted portions subsequently rotated into a substantially transverse orientation, with respect to the centerline of the original sheet material;

3,673,057 dated June 27, 1972 in the name of Theodore H. Fairbanks, and entitled Cellular Structures; Piercing or slitting the sheet, creating an arrangement of trapezoidal-shaped tabs and subsequently twisting them into an orientation substantially perpendicular to the centerline of the original sheet material;

4,027,058 dated May 31, 1977 in the name of William A. Wootten, and entitled Folded Structural Panel; Creating a series of parallel short slits in the sheet material, and subsequently raising opposing triangular projections out of the slitted regions of the sheet.

3. Truss core, pleated core, or corrugated core structures made with substantially parallel, longitudinally-oriented, rows of relatively simple corrugations. This strategy for creating panel cores is exemplified by the following U.S. Pat. Nos.:

4,035,538 dated July 12, 1977 in the name of Maekawa et al., and entitled Core Block for Plywood and Method and Apparatus for Forming Same; Partially slitting and bend-forming thin plies of sheet material, e.g. wood, into a pleated series of V-shaped ribs, by passing the core material through specialized corrugation rolls;

4,223,053 dated Sept. 16, 1980 in the name of Joseph Brogan, and entitled Truss Core Panels; Assembling a plurality of long, horizontal, triangular tubes together, arranging them side-by-side with their inclined walls adjoining, to form the truss-like core structure;

4,632,862 dated Dec. 30, 1986 in the name of Stephen J. Mullen, and entitled I-Beam Honeycomb Material; Stacking and affixing together multiple layers of sheet material to which has been imparted an alternating sequence of successive U-shaped and N-shaped longitudinal corrugations.

4. Multi-component core structures built-up from a plurality of individual sheet, plate, or strip elements and affixing them together to effect a substantially gridlike bearing surface on one or both of the opposing parallel planes. This strategy for creating panel cores is exemplified by the following U.S. Pat. Nos.:

3,741,859 dated June 26, 1973 in the name of Kurt Wandel, and entitled Reinforced Corrugated Board Member; Inserting a plurality of parallel, vertically-oriented web strips into transverse slots cut into the ribs of a corrugated core structure at regularly spaced intervals to reinforce the structure in its normally weaker direction, perpendicular to the direction of the corrugated ribs;

3,849,237 dated Nov. 19, 1974 in the name of Lev Zetlin, and entitled Structural Member of Sheet Material; Arranging a plurality of triangular-shaped, tetrahedron-shaped, or pyramid-shaped reinforcements into the troughs of a pleated or corrugated core structure to compensate for an otherwise typical lack of support of the face sheets between ridges and valleys of the successive parallel corrugations;

4,573,304 dated Mar. 4, 1986 in the name of David F. Mieyal, and entitled Honeycomb Floor Panel and the Like; Arranging a plurality of vertically oriented, slotted strips together in a grid pattern to form a sandwich panel core structure.

5. Hybrid corrugated sheet structures with secondary ribs or corrugations added to stiffen the inclined sidewalls or flanks of the main corrugations. This strategy for creating panel cores is exemplified by the following U.S. Pat. Nos.:

1,847,216 dated Mar. 1, 1932 in the name of Cecil R. Hubbard, and entitled Packing; A piston rod packing material of soft metal in accordance with the general description above, with the inclined walls of the zigzag folded structure being stiffened by secondary corrugations;

2,896,692 dated July 28, 1959 in the name of Camillo Villoresi, and entitled Method of Making Cushioning Paper; Cushioning or packing medium of corrugated paper such that serpentine or zigzag secondary corrugations are provided;

3,992,162 dated Nov. 16, 1976 in the name of Lucien Victor Gewiss, and entitled Sheet with Alternate Protrusions and Recesses; Alternate protrusions and recesses formed into a sheet material, in a geometry similar to the previous two referenced U.S. Patents, "the walls of each such protrusion and recess being composed exclusively of non-rectangular elementary surfaces;"

4,472,473 dated Sept. 18, 1984 in the name of Randall C. Davis et al., and entitled Curved Cap Corrugated Sheet; A formed sheet structure comprising successive rows of slightly rounded U-shaped corrugations, with the inclined sidewalls being stiffened by secondary corrugations;

4,518,544 dated May 21, 1985 in the name of Thomas P. Carter et al., and entitled Serpentine Film Fill Packing for Evaporative Heat and Mass Exchange; A heat exchanger film packing core structure built up of plural thin sheets having successive rows of serpentine corrugations.

SUMMARY OF THE INVENTION

The primary object of the present invention is to provide a practical, structurally efficient, economical, fairly easily fabricated alternative to prior art honeycomb core structures and the like, and which is particularly well suited for use in sandwich panel-type articles manufactured in relatively large quantities at swift production rates.

Another object is to provide a three-dimensional structure adapted for use as a core in sandwich panel-type construction, comprising a substantially continuous unbroken sheet material to which has been imparted an alternating sequence of ridges and valleys, creating successive rows of adjacent inclined rectangular-shaped facets which are stiffened by intermediate rows of adjoining substantially orthogonal, parallelogram-shaped facets, providing generally gridlike bearing surfaces on opposing parallel planes.

A further object of the invention is to provide a three-dimensional structure formed of an alternating sequence of ridges and valleys which demarcate spaced rows of generally rectangular-shaped facets connected by intermediate rows of generally parallelogram-shaped facets.

A still further object of the invention is to provide a structure of the above type which is comprised of sheet material folded or creased into the alternating sequence of ridges and valleys.

BRIEF DESCRIPTION OF THE DRAWINGS

FIG. 1 is a perspective view of an embodiment of this invention, illustrating the cellular nature of the core structure providing gridlike bearing surfaces on opposing upper and lower parallel planes; In this embodiment as shown, the parallelogram-shaped facets are orthogonally disposed with respect to the rectangular-shaped facets, to form closed cell walls in the core structure;

FIG. 2 is a fragmentary, plan view illustrating the characteristic alternating rows of adjoining rectangles and parallelograms which may be developed on a flat sheet of material prior to commencement of the progressive forming operation in the preferred method of producing the core structure of the invention by folding or creasing;

FIG. 3 is a perspective, explanatory view illustrating the sheet material of FIG. 2 in its early stage of forming by folding or creasing, to which an alternating sequence of ridge and valley folds has been imparted at the borders of the rectangles and parallelograms of FIG. 2, creating a multiplicity of distinct adjoining facets;

FIG. 4 is a perspective, explanatory view illustrating the sheet material of FIG. 3 at a further advanced stage of forming;

FIG. 5 is a perspective, explanatory view illustrating the sheet material of FIG. 4 at a further advanced stage of forming, with the creation of trough-bottomed cellular compartments becoming apparent;

FIG. 6 is a fragmentary, perspective view illustrating the folded sheet material of FIG. 5 at a further advanced stage of forming, and with face sheets being affixed to the upper and lower gridlike bearing surfaces of the formed core structure to create a sandwich-type panel; In this embodiment, the parallelogram-shaped facets are not completely orthogonally arranged or disposed with respect to the adjacent rectangular-shaped facets;

FIG. 7 is a fragmentary, plan view of the sandwich panel of FIG. 6, with the top face sheet partially cut away, and further illustrating a geometric layout of gridlike bearing surfaces of the core structure, and to which are attached the aforementioned top and bottom face sheets; and FIG. 8 is a fragmentary, and elevational view taken generally along the plane of line 8—8 of FIG. 7 looking in the direction of the arrows, and illustrating the primary corrugated nature of the core structure illustrated in FIGS. 6 and 7.

DETAILED DESCRIPTION OF THE INVENTION

Referring again to the drawings, FIG. 1 illustrates the cellular nature of the thin-walled core structure 10. Structure 10 comprises an alternating sequence of ridge lines 12 and 13 and valley lines 14 and 15, which characterize the structure, and which may be formed of suitable sheet material by folding or creasing, as will be hereinafter described in detail. It will be understood that while "folding" or "creasing" of sheet material is preferred for formation of the core structure of the invention, certain other methods, as are referred to in the Background of the Invention section of this application, might be utilized instead. Accordingly, the hereinafter use of the term "fold" in the specification is not meant as a limiting term of description.

The ridge folds 12 and 13 each constitute a segment of the network of fold lines comprising the upper bearing surface of the structure. Similarly, the valley folds 14 and 15 each constitute a segment of the network of fold lines comprising the lower bearing surface of the structure. With reference to FIG. 1, inclined fold lines 16 and 17 occur in a repetitive sequence, alternately traversing the distance between the intersecting end points of the individual ridge fold lines 12 and 13 and the intersecting end points of the individual valley fold lines 14 and 15. The resultant effect of the patterned arrangement of fold lines 12, 13, 14, 15, 16 and 17 is to demarcate a multiplicity of adjoining facets 20, 21 and 22.

FIG. 2 illustrates a layout of the aforementioned fold lines 12, 13, 14, 15, 16 and 17 on a flat sheet of core material 24 prior to commencement of the progressive forming operation on said flat sheet. It can be seen in FIG. 2 how the subsequently accomplished fold lines 12, 14, 16 and 17 demarcate spaced rows of adjoining rectangular-shaped facets 20, and how the subsequently accomplished fold lines 13, 15, 16 and 17 demarcate intermediate rows of adjoining parallelogram-shaped facets 21 and 22.

Point O indicates the assumed position for the origin of a superimposed three-dimensional rectangular coordinate system, adopted as a frame of reference to facilitate the definition of the dimensional parameters referred to by letters A, B, C, D, E and letters A', B', C', D', E' which are associated with respectively the intial geometry and then the final geometry of the subject sheet 24 of core material. The assumed x-axis and the assumed y-axis are oriented as shown in FIG. 2. The assumed z-axis also has its origin at point O and is oriented in the direction of the thickness dimension D of the sheet material 24 prior to forming thereof, and in its preliminary substantially flat condition. The dimensional parameters A, B, C, D and E are defined, with reference to FIG. 2, as follows:

A: An illustrative projected length, onto the x-axis, of each one of the ridge fold lines 13 or each one of the valley fold lines 15 which define each respective parallelogram-shaped facet 21 or 22, measured prior to commencement of a progressive forming operation. A is always greater than zero.

B: An illustrative projected length, onto the y-axis, of each one of the ridge fold lines 13 or each one of the valley fold lines 15, measured prior to commencement of the progressive forming operation. B is always greater than zero.

C: An illustrative projected length, onto the y-axis, of each one of the ridge fold lines 12 or each one of the valley fold lines 14 which define each respective rectangular-shaped facet 20, measured prior to commencement of the progressive forming operation. The length C must be greater than zero, in keeping with the general embodiment of the present invention, with the provision of spaced rows of adjoining rectangular-shaped facets 20.

D: An illustrative thickness dimension of the flat sheet 24 of core material, measured prior to commencement of the progressive forming operation. The thickness dimension D, shown in FIG. 1, is always greater than zero.

E: An illustrative projected length, onto the x-axis, of the perpendicular distance between two successive ridge fold lines 12, measured prior to commencement of the progressive forming operation. The length E is always greater than zero. The dimension E/2 is one-half of the length E just defined. The dimension E/2 may also be interpreted as the typical projected length, onto the x-axis, of one of the fold lines 16 or 17 which define each rectangular-shaped facet 20 and adjacent parallelogram-shaped facet 21 or 22, measured prior to commencement of the progressive forming operation.

Referring now to FIGS. 3, 4 and 5, the latter consecutively illustrate the transition of the originally generally flat sheet material 24 through successive stages of forming, as ridge folds 12 and 13, valley folds 14 and 15, and inclined folds 16 and 17 are imparted to the sheet material 24 through one or more known mechanical forming processes. The rectangular-shaped facets 20 and the parallelogram-shaped facets 21 and 22 gradually become more prominent as the progressive forming operation ensues. In the perspective views of FIGS. 3, 4 and 5, ridge folds 12 and 13 are distinguished separately from valley folds 14 and 15 in that ridge folds are predominantly concave downward, while valley folds are predominantly concave upward. In a similar manner, one set of inclined folds 16, comprising inclined folds which are substantially concave obliquely downwardly, is distinguished separately from the alternate set of inclined folds 17, comprising inclined folds which are substantially concave obliquely upwardly.

FIG. 6 illustrates the further transition of the core sheet material 24 as the progressive forming operation continues to sharpen all the folds 12, 13, 14, 15, 16, and 17, simultaneously reducing the angles formed between the mutually adjoining facets 20, 21 and 22 to arrive at a desired finalized core 24'. FIG. 6 also depicts a lower face sheet 26 and an upper face sheet 28 being affixed to the folded finalized core structure 24' of sheet material. Depending on the combination of constituent materials selected, any suitable means of fixing the face sheets 26 and 28 to the folded core 24', may be provided, including the use of adhesives, resins, welding, brazing, diffusion-bonding, or any other suitable means or combinations thereof. The lines of tangency at the lower surfaces of the valley folds 14 and 15 occur substantially within the same plane, providing a substantially continuous, gridlike contact surface on core 24' to which the lower face sheet 26 may be affixed or secured. Similarly, the lines of tangency at the upper surfaces of the ridge folds 12 and 13 occur substantially within the same plane, providing a substantially continuous, gridlike upper contact surface on core 24' to which the upper face sheet 28 may be affixed or secured. The upper sheet 28, in FIG. 6, has been shown as being rolled back from one end of the sandwich construction 30 illustrated, to show the finalized formed core structure 24' of the FIG. 6 embodiment, and the difference between it and the folded or creased condition of the sheet material forming the core structure as illustrated for instance in FIG. 5.

FIGS. 7 and 8 further illustrate the final layout of the FIG. 6 embodiment of folded core of sheet material after completion to the extent desired of a progressive forming operation, and after enclosure between opposing parallel face sheets 26 and 28, to form a sandwich panel-type structure 30. The same superimposed three-dimensional rectangular coordinate system as used in FIG. 2 is adopted as a frame of reference, this time to facilitate the definition of the dimensional parameters associated with the final geometric configuration of the core structure 24'. The dimensional parameters A', B', C', D' and E' are defined, with reference to FIGS. 7 and 8, as follows:

A': The typical projected length, onto the x-axis, of one of the ridge fold lines 13 or one of the valley fold lines 15 which border between adjacent parallelogram-shaped facets 21 or 22, measured after completion of the progressive forming operation. The length A' is both greater than zero and greater than the length A.

B': The typical projected length, onto the y-axis, of one of the ridge fold lines 13 or one of the valley fold lines 15 which border between adjacent parallelogram-shaped facets 21 or 22, measured after completion of the progressive forming operation. The length B' is both greater than zero and less than the length B, and preferably is within the range of approximately one-tenth to approximately one quarter of each respective dimension A' or C'. As a limit, the length B' may approach a length substantially equal to twice the thickness dimension D of the material from which the core is made.

C': The typical projected length, onto the y-axis, of one of the ridge fold lines 12 or one of the valley fold lines 14 which border between adjacent rectangular-shaped facets 20, measured after completion of the progressive forming operation. The length C' is both greater than zero and substantially equal to length C, in keeping with the general embodiment of the present invention, with the provision of spaced rows of adjoining rectangular-shaped facets 20.

D': The typical projected length, onto the z-axis, of the perpendicular distance between the plane of tangency at the lower extreme surfaces of the valley folds 14 and 15, and the plane of tangency at the upper extreme surfaces of the ridge folds 12 and 13, measured after completion of the progressive forming operation. The dimension D' may also be interpreted as the typical overall depth of the completed or finalized folded cellular core structure 24'. The dimension D' is both greater than zero and greater than the dimension D. It is preferable that the dimension D' is substantially greater than the dimension D, and as for instance, it is preferred that the dimension D' is at least 10 to 300 times greater than the dimension D.

E': The typical projected length, onto the x-axis, of the perpendicular distance between two successive ridge fold lines 12, measured after completion of the progressive forming operation. The length E' is both greater than zero and less than the length E. It is preferable that the length E' is substantially equal to the length A', for the provision of substantially gridlike bearing surfaces on opposing parallel planes of the completed or finalized core 24'.

BEST MODE FOR CARRYING OUT THE INVENTION

The preferred method of producing the cellular core structure of the present invention is to begin with a substantially flat sheet of material dispensed from a continuous coil or roll, and then subject the sheet material to the progressive folding or forming operation required to impart the desired multi-faceted reticular configuration. Although one or more of the basic mechanical forming processes common to the prior art may be utilized, the preferred forming process is preferably generally similar to the methods of producing core structures as described and illustrated for instance in U.S. Pat. Nos. 2,896,692; 3,542,636; 3,741,859; 4,035,538; and 4,632,862, where one or more pairs of meshing forming cylinders, corrugating drums, or indenting rolls are used to progressively manipulate sheet material into the desired final shape. Those skilled in the art of providing such material forming equipment may readily adapt presently available die-making technology to provide necessary tooling for the rapid, progressive manufacture of the illustrated and described embodiments of the cellular core structure of this invention.

In this connection, it will be seen that in the formation of the core 24' illustrated in FIGS. 6 and 7, wherein the facets 21 and 22 are not completely orthogonally disposed or folded with respect to the adjacent rectangular facets 20 during longitudinal and lateral collapsing or inward folding of the sheet material to the finalized formed condition of the core 24', there is thus provided communication as at 31, between the laterally-oriented cells 32 of the core structure, providing a generally serpentine path between adjacent rows of the cells 32 in a generally transverse direction within the sandwich panel construction. Such paths can be utilized to provide access laterally through the core or sandwich for items, such as for instance, wires, air flow, fluid flow, or any other desired access condition.

In the embodiment of core structure illustrated in FIG. 1, the parallelogram-shaped facets 21 and 22 are substantially completely orthogonally formed or folded with respect to the adjacent rectangular-shaped facets 20, and therefore the cells of the core are in substantially non-communicating relation with respect to one another in a direction laterally or transverse within the core.

While the core structure of the present invention has been illustrated and described in connection with sandwich panel-type construction, as may be used for instance in floors, walls, ceilings, partitions, doors, modular structures, table tops, vehicle panels, aerospace structures, and the like, such core structure, with the proper selection of suitable material from which it is made, might also be utilized as a dunnage, or matting, or heat exchanger, or decorative surface element, and the like, as will be apparent to those of ordinary skill in this art.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:

1. A three-dimensional structure comprising an alternating sequence of essentially linear ridges and valleys which demarcate spaced rows of generally rectangular-shaped facets connected by intermediate rows of non-rectangular generally parallelogram-shaped facets, wherein said structure is foldably formed from a continuous unbroken sheet material wherein said sheet material has a surface area, said surface area being filled with a repeating pattern of unit cells, each said unit cell comprising:

a first pair of generally rectangular-shaped facets, each said facet having first, second, third and fourth sides, said first and third side and said second and fourth side of each facet being opposing, such that the third side of the first of the pair of facets coincides with the first side of the second of the pair of facets, the respective second sides and fourth sides of the pair of facets being colinear;

a first pair of non-rectangular generally parallegllogram-shaped facets, each said facet having first, second, third and fourth sides, said first and third side and said second and fourth side of each facet being opposing, such that the angle between the first and second sides is an acute angle and the third side of the first of the pair of facets coincides with the first side of the second of the pair of facets, the respective second sides and fourth sides of the pair of facets being colinear, the colinear fourth sides of the first pair of parallelogram-shaped facets being coincident with the colinear second sides of said first pair of generally rectangular-shaped facets;

a second pair of generally rectangular-shaped facets, each said facet having first, second, third and fourth sides, said first and third side and said second and fourth side of each facet being opposing, such that the third side of the first of the pair of facets coincides with the first side of the second of the pair of facets, the respective second sides and fourth sides of the pair of facets being colinear, the colinear fourth sides of the second pair of generally rectangular-shaped facets being coincident with the colinear second sides of said first pair of generally parallelogram-shaped facets; and a second pair of non-rectangular generally parallelogram-shaped facets, each said facet having first, second, third and fourth sides, said first and third side and said second and fourth side of each facet being opposing, such that the angle between the second and third sides is an acute angle and the third side of the first of the pair of facets coincides with the first side of the second of the pair of facets, the respective second sides and fourth sides of the pair of facets being colinear, the colinear fourth sides of the second pair of parallelogram-shaped facets being coincident with the colinear second sides of said second pair of generally rectangular-shaped facets.

2. The structure in accordance with claim 1 wherein the alternating sequence of essentially linear ridges and valleys are formed by folding of the sheet material so that the respective first and third sides of the facets of the unit cells comprise said ridges and valleys, the respective second and fourth sides forming interconnections between said ridges and valleys.

3. A structure in accordance with claim 2 wherein, when folded, the projected length on to a plane parallel to the extreme bearing surfaces of the structure, as defined by said ridges and said valleys, of the first and third sides of the parallelogram facets is considerably smaller than each of the the length of the first and third sides of the rectangular facets, and within the range of approximately one-tenth to approximately one-quarter of the length of said first and third sides of said rectangular facets.

4. A structure in accordance with claim 2 wherein the projected length on to a plane parallel to the extreme bearing surfaces of the structure, as defined by said ridges and said valleys, of the first and third sides of the parallelogram facets, when folded, is substantially minimized with respect to the length of the first and third sides of the rectangular facets, and approaching, as a limit, a length substantially equal to twice the thickness of the sheet material.

5. A structure in accordance with claim 1 with a face sheet or sheets affixed to at least one of the extreme bearing surfaces of the structure, as defined by said ridges and valleys.

6. A structure in accordance with claim 1 with face sheets affixed to both of the extreme bearing surfaces of the structure, as defined by said ridges and valleys.

7. A structure in accordance with claim 1 formed from sheet material which has been folded into said alternating sequence of ridges and valleys.

8. A structure in accordance with claim 1 wherein said adjacent parallelogram-shaped facets are disposed substantially orthogonally with respect to adjacent of said rectangular-shaped facets.

9. A structure in accordance with claim 1 wherein said parallelogram-shaped facets are not disposed orthogonally with respect to adjacent of said rectangular-shaped facets, and provide communication between the cells of said structure.

10. A structure in accordance with claim 1 wherein the perpendicular distance between the extreme bearing surfaces of the structure, as defined by said ridges and valleys is at least 10 times to 300 times greater than the thickness of the sheet material.

11. A structure in accordance with claim 1 wherein the sheet material comprises metal.

12. A structure in accordance with claim 1 wherein the sheet material comprises plastic.

13. A structure in accordance with claim 1 wherein the sheet material comprises paper.

14. A structure in accordance with claim 1 wherein the sheet material comprises fabric.

* * * * *